United States Patent [19]
Magyar et al.

[11] Patent Number: 6,120,098
[45] Date of Patent: Sep. 19, 2000

[54] RING-TYPE RECLINER

[75] Inventors: Joseph J. Magyar, Fenton; William D. Wilstermann, Shelby Township, both of Mich.

[73] Assignee: Magna Lomason Corporation, Farmington Hills, Mich.

[21] Appl. No.: 09/115,590

[22] Filed: Jul. 15, 1998

Related U.S. Application Data

[60] Provisional application No. 60/052,554, Jul. 15, 1997.

[51] Int. Cl.$^7$ ...................................................... B60N 2/20
[52] U.S. Cl. ..................... 297/367; 297/366; 297/378.1; 297/344.11
[58] Field of Search ................................. 297/367, 378.1, 297/344.11, 366

[56] References Cited

U.S. PATENT DOCUMENTS

| | | | |
|---|---|---|---|
| 3,958,828 | 5/1976 | Ishida et al. | 297/367 X |
| 4,146,267 | 3/1979 | Mori et al. | 297/367 |
| 4,348,050 | 9/1982 | Letournoux et al. | 297/367 X |
| 4,770,464 | 9/1988 | Pipon et al. | 297/367 |
| 4,874,205 | 10/1989 | Arefinejad et al. | 297/367 X |
| 4,997,223 | 3/1991 | Croft | 297/367 |
| 5,161,856 | 11/1992 | Nishino | 297/367 |
| 5,224,759 | 7/1993 | Matsuura et al. | 297/367 |
| 5,590,931 | 1/1997 | Fourrey et al. | 297/367 X |
| 5,611,599 | 3/1997 | Baloche et al. | 297/367 |
| 5,622,407 | 4/1997 | Yamada et al. | 297/367 X |
| 5,681,086 | 10/1997 | Baloche et al. | 297/367 |
| 5,692,589 | 12/1997 | Beguin | 297/367 X |
| 5,749,624 | 5/1998 | Yoshida | 297/367 |
| 5,755,491 | 5/1998 | Baloche et al. | 297/367 X |
| 5,762,400 | 6/1998 | Okazaki et al. | 297/367 |
| 5,769,494 | 6/1998 | Barrere et al. | 297/367 |
| 5,779,313 | 7/1998 | Rohee | 297/367 |
| 5,788,325 | 8/1998 | Ganot | 297/367 X |
| 5,816,656 | 10/1998 | Hoshihara et al. | 297/367 |
| 5,881,854 | 3/1999 | Rougnon-Glasson | 297/367 X |

FOREIGN PATENT DOCUMENTS

| | | |
|---|---|---|
| 0 024 976 | 3/1981 | European Pat. Off. . |
| 1347823 | 11/1963 | France . |
| 2225783 | 11/1974 | France . |
| 2 258 817 | 8/1975 | France . |
| 2 463 596 | 2/1981 | France . |
| 2 364 754 | 8/1974 | Germany . |
| 3521730 | 12/1985 | Germany . |
| 2 117 440 | 10/1983 | United Kingdom . |

Primary Examiner—Peter M. Cuomo
Assistant Examiner—Rodney B. White
Attorney, Agent, or Firm—Pillsbury Madison & Sutro LLP

[57] ABSTRACT

A recliner assembly for hingedly connecting a seat back and a seat cushion. The recliner assembly has a base plate mounted to the seat cushion, an arm mounted to the seat back and a locking mechanism for locking the seat back in one of a range of seat back positions and selectively releasing the seat back for adjustment of the seat back relative to the seat cushion and dumping the seat forwardly providing access rearward of the seat cushion. The base plate has a circular cavity with an inner circumference lined with teeth. The arm is mounted to the seat back and pivotally engages the base plate for sliding relative movement thereto for forward and rearward pivotal movement of the seat back. The arm has a circular cavity with an inner circumference lined with teeth and is coaxially mounted in a face to face manner with the circular cavity of the base plate. The locking mechanism has a plurality of pawl, a camming member and an actuator. The pawls are pivotally connected to the base plate and movable between an engaged position where the pawls lockably engage the teeth of both the base plate and the arm and a disengaged position where the pawls are disengaged therefrom. The camming member is rotatably mounted between the base plate and the arm and is rotatable in a first sense engaging the plurality of pawls urging the pawls to the disengaged position and rotatable in an opposite sense engaging the plurality of pawls urging the pawls to the engaged position. The actuator operatively engages the camming member for effecting the rotatable movement of the camming member to selectively lock and release the recliner assembly.

12 Claims, 7 Drawing Sheets

Fig. 5

RING-TYPE RECLINER

This application claims benefit of Provisional Appln. 60/052,554 filed Jul. 15, 1997.

FIELD OF INVENTION

The present invention relates to reclining vehicle seat assemblies having a recliner assembly. The present invention also relates to recliner assemblies for use in vehicle seat assemblies.

BACKGROUND OF INVENTION

Recliner assemblies are well-known devices which can be installed on a motor vehicle seat assembly and provide for forward and rearward reclining movement of a seat back structure through a range of reclining positions. Such recliner assemblies utilize various constructions in order to provide this reclining movement.

U.S. Pat. No. 4,348,050 discloses an example of a conventional ring-type recliner in which a pair of generally circular locking rings and a number of slidable locking members are used in order to prevent and allow forward and rearward reclining movement of a seat back with respect to a seat structure. The two coaxial locking rings have teeth disposed about their inner circumference and are disposed adjacent to one another. When the recliner assembly is in the locked position, the sliding locking members engage the teeth on both locking rings to thereby ensure that forces applied to the seat back structure are transmitted to the seat structure through the sliding locking members. A rotating circular cam member is disposed centrally with respect to the locking rings such that rotation of the cam member in a locking direction slides the sliding locking members radially outwardly into engagement with the two locking rings.

In order to release the recliner assembly and allow for a reclining movement of the seat back, the camming member is rotated to a released position and the application of force in a forward or rearward reclining direction to the seat back causes rotation of the locking ring associated with the seat back relative to the locking ring associated with the seat structure such that the movement of the teeth cam the sliding locking members out of engagement with both locking rings. This construction, however, is undesirable in that the camming action required to slidably move the sliding locking members out of engagement with the teeth on the locking rings will wear down the surfaces of the teeth on both the rings and the locking members over a period of repetitive usage. Also, debris and foreign objects which may find their way into the recliner assembly may jam one or more of the locking members and cause one of them to stick, thereby giving an occupant a false indication that the recliner assembly is in a locked position when he applies pressure to the seat back and the seat back fails to move. In this situation, the jammed locking member may unjam and thereby unlock the recliner assembly during high force conditions, such as a collision, thereby presenting a potentially unsafe situation.

SUMMARY OF INVENTION

The disadvantages of the prior art may be overcome by providing a recliner assembly in which the locking members are moved out of engagement with the teeth of the locking rings in a positive manner rather than relying on the camming action which occurs between the teeth of the rings and locking member.

In accordance with the principles of the present invention, there is provided a recliner assembly for use in a reclining vehicle seat assembly for a motor vehicle. The recliner assembly has a base plate mounted to the seat cushion, an arm mounted to the seat back and a locking mechanism for locking the seat back in one of a range of seat back positions and selectively releasing the seat back for adjustment of the seat back relative to the seat cushion and dumping the seat forwardly providing access rearward of the seat cushion. The base plate has a circular cavity with an inner circumference lined with teeth. The arm is mounted to the seat back and pivotally engages the base plate for sliding relative movement thereto for forward and rearward pivotal movement of the seat back. The arm has a circular cavity with an inner circumference lined with teeth and is coaxially mounted in a face to face manner with the circular cavity of the base plate. The locking mechanism has a plurality of pawl, a camming member and an actuator. The pawls are pivotally connected to the base plate and movable between an engaged position where the pawls lockably engage the teeth of both the base plate and the arm and a disengaged position where the pawls are disengaged therefrom. The camming member is rotatably mounted between the base plate and the arm and is rotatable in a first sense engaging the plurality of pawls urging the pawls to the disengaged position and rotatable in an opposite sense engaging the plurality of pawls urging the pawls to the engaged position. The actuator operatively engages the camming member for effecting the rotatable movement of the camming member to selectively lock and release the recliner assembly.

DETAILED DESCRIPTION OF THE DRAWINGS

Figure 1:
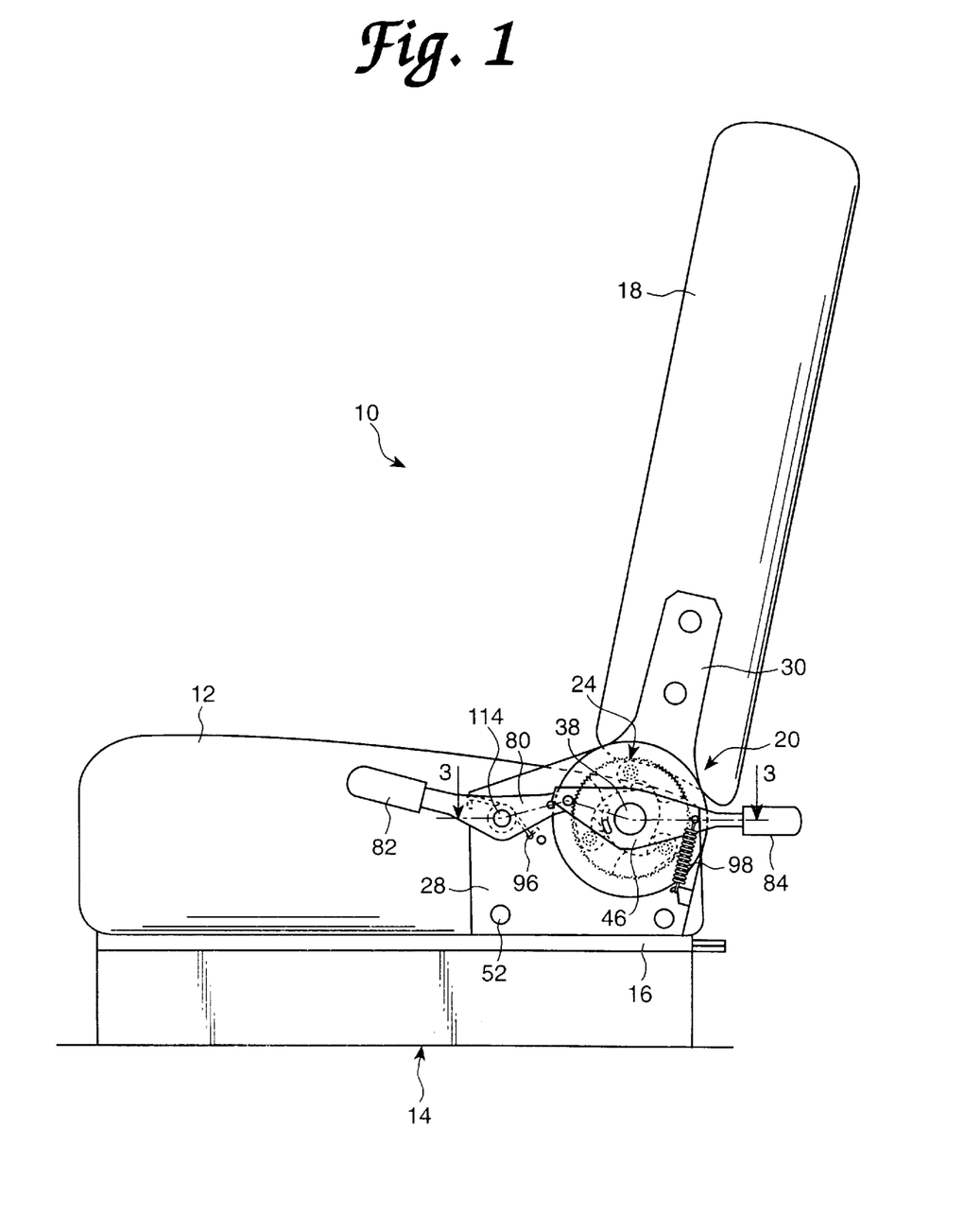
FIG. 1 of the drawings illustrates an embodiment of the present invention, showing an elevated side view of a vehicle with an arrangement of an automotive seat assembly with a recliner assembly embodying the principles of the present invention with a proximal side cover plate removed to reveal the operating components.

Referring now more particularly to the drawings, there is shown in FIG. 1 thereof a vehicle seat assembly, generally indicated at 10, embodying the principles of the present invention. The seat assembly 10 includes a seat cushion 12 which includes a seat mount 14 which mounts the seat assembly 10 in any conventional fashion on the vehicle floor. A set of track assemblies 16 mounts the seat cushion 12 on the mounting structure 14 for fore and aft adjusting movements.

The seat assembly 10 also includes a seat back 18 which is mounted on the seat cushion 12 by a recliner assembly 20, which is constructed in accordance with the principles of the present invention. As shown in FIGS. 2A, 2B, 4, and 5, the recliner assembly 20 comprises two main components; namely, a support structure 22, and a manually releasable locking mechanism 24. The support structure 22 comprises a fixed outer base plate 26, a fixed inner base plate 28, and a seat back arm 30. The outer base plate 26 and the inner base plate 28 are attached to the seat cushion 12 to form a stable platform that structurally surrounds the seat back arm 30 and components of the locking mechanism 24.

Figure 2A:
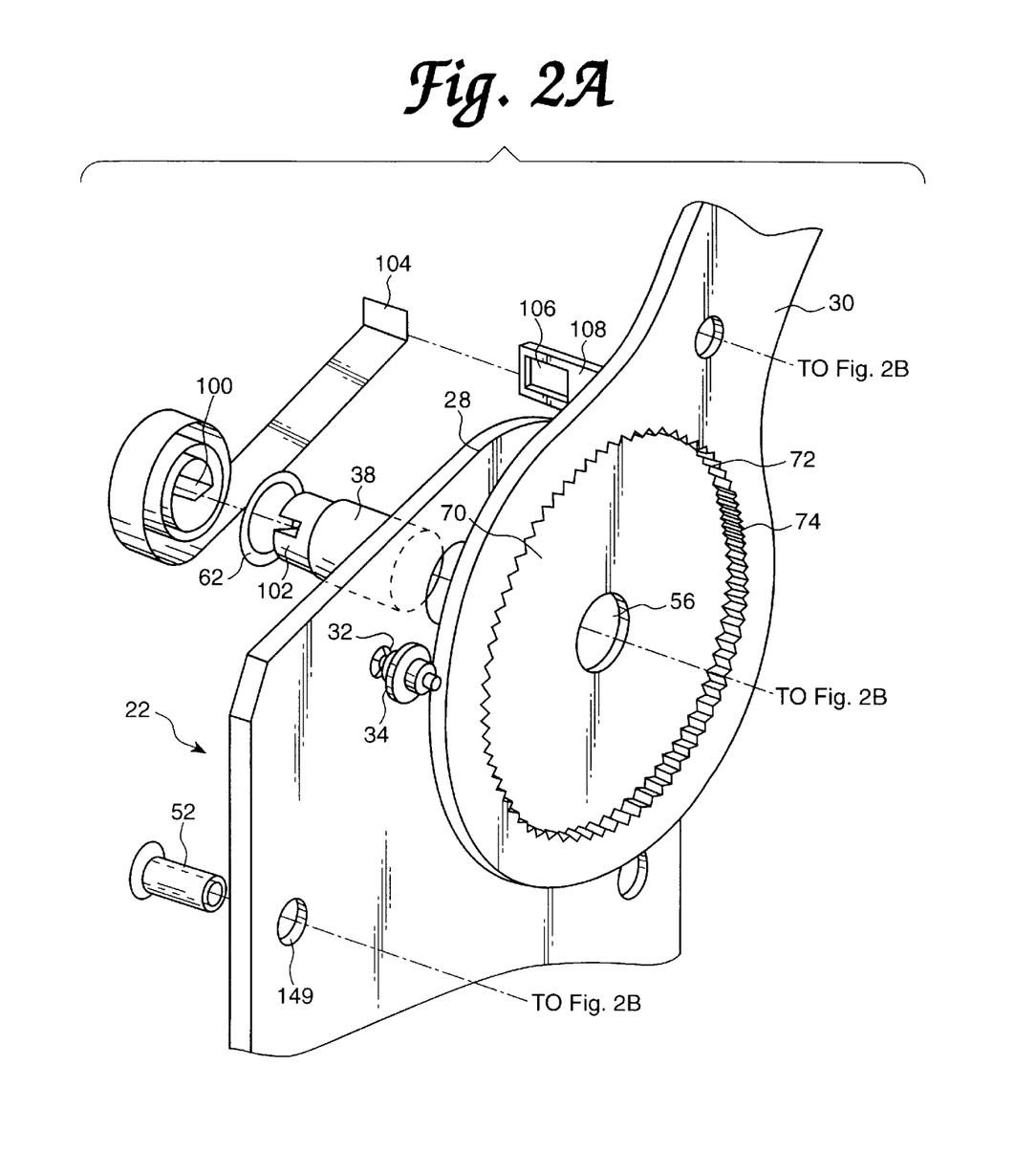
FIG. 2A of the drawings is an exploded view of the recliner assembly of FIG. 1, with hidden components shown in phantom notation.
Figure 2B:
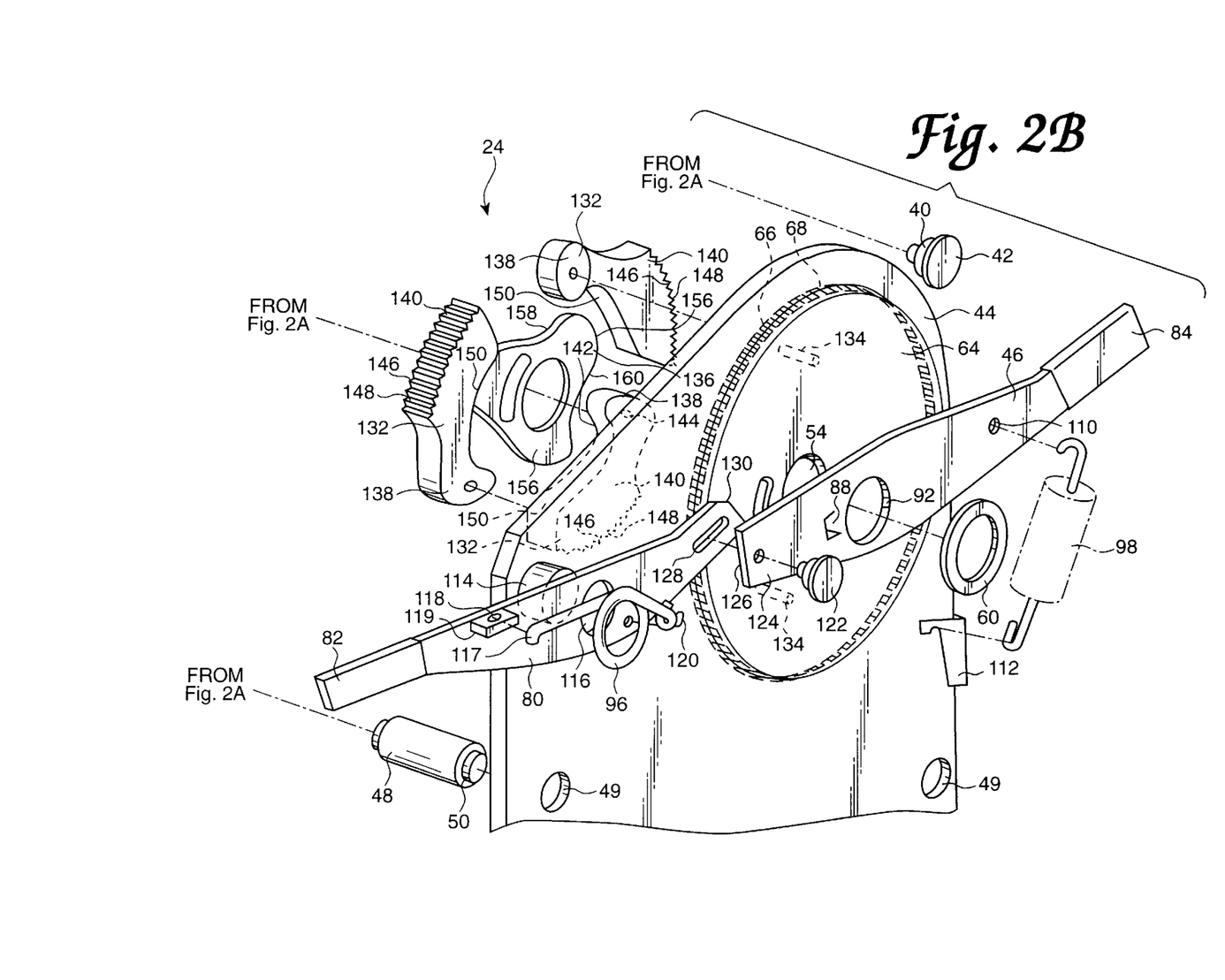
FIG. 2B of the drawings is an exploded view of the recliner assembly of FIG. 1, with hidden components shown in phantom notation.
Figure 3:
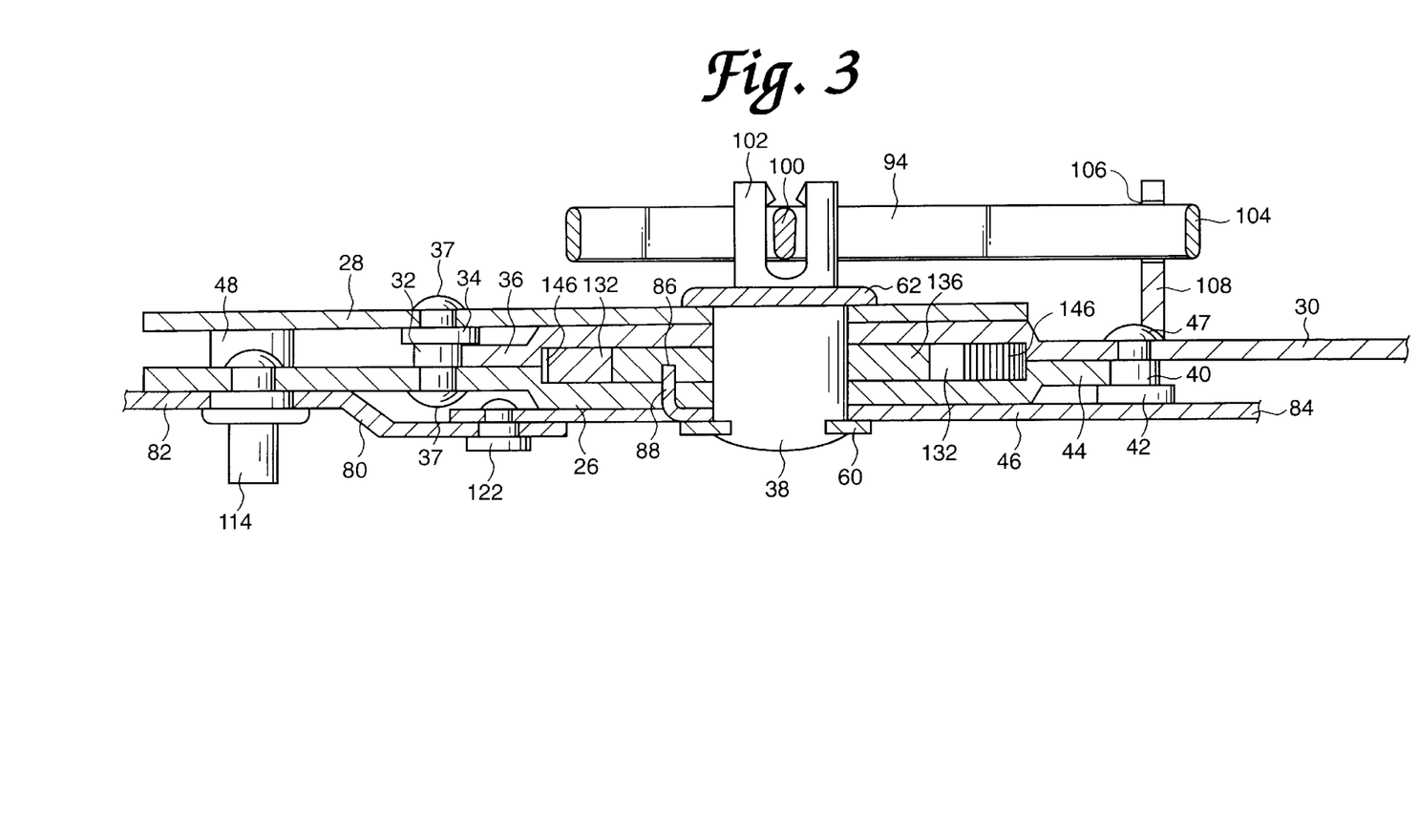
FIG. 3 of the drawings is a cross section through line 3—3 of FIG. 1 as it would appear with the seat back locked in an upright position.

The outer base plate 26 is constructed with a recessed, shallow circular inner cavity 64 with an inner circumference 66 lined with spaced teeth 68. The seat back arm 30 is similarly constructed with a recessed, shallow circular inner cavity 70 with an inner circumference 72, also lined with spaced teeth 74. The diameter of cavities 64, 70 are identical in size. The number, spacing, pitch, and width of the teeth 68, 74 are also identical.

The outer base plate 26 and seat back arm 30 are coaxially mounted on the pivot pin 38 in a face to face manner for interaction with the manually releasable locking mechanism 24 and define a cup shaped space within which components of the releasable locking mechanism 24 are mounted and operate.

The recliner assembly 20 pivots about a pivot axis passing axially through the pivot pin 38. The pivot axis extends transversely with respect to the seat assembly 10 when the recliner assembly 20 is in the installed position. The pivot pin 38 passes through a series of circular apertures 54, 56, and 58 respectively and through a front retaining washer 60. The pivot pin 38, and the retaining washer 60, hold the support structure 22 together, and axially align the manually releasable locking mechanism 24 within the support structure 22.

The support structure 22 is connected together with spacers having different size protrusions to maintain proper spacing and alignment between the support structure members 26, 28, and 30. A base alignment spacer 32 is fixedly connected between the outer base plate 26 and the inner base plate 28. A circular alignment protrusion 34 formed on the spacer 32 between the outer base plate 26 and the inner base plate 28 is disposed in abutting engagement with an axially offset outer portion 36 of the seat back arm 30.

The circular protrusion 34 allows pivotal movement of the seat back arm 30 relative to the outer base plate 26 and the inner base plate 28 about a pivot pin 38. The spacer 32 is fixed to the outer base plate 26 and the inner base plate 28 by cold-forming the ends as indicated at 37. The pivotal movement of the movable seat back arm 30 is also guided by a spacer 40 with radially extended portion 46 which keeps the inner base plate member 26 aligned properly with the seat back arm 30. A circular outer alignment hub 42 on the alignment spacer 40 maintains the alignment between a radially extended outer portion 44 of the outer base plate 26 and the seat back arm 30 by securing the extended outer portion 44 in place between the seat back arm 30 and the alignment hub 42. The alignment hub 42 also maintains proper spacing for a rearward handle 59 while the seat back 18 is being repositioned or the rearward handle 59 is being operated. A swedged outer axial surface 47 on the alignment spacer 40 keeps the attached components in place.

A pair of base member spacers 48 fitted between openings 49 in the outer base plate 26 and in the inner base plate 28 keep the base plate 26, 28 aligned. Each spacer 48 contains a hollow circular center 50 through which a suitable bolt 52 extends to attach the support assembly 22 to the seat cushion 12.

As can be appreciated from the Figures, the outer base plate 26 and seat back arm 30 do not have to be coaxial with the pivot axis and may offset to another position and connected to the seat back 18 by means of a linkage or other connecting device. It is also within the scope of the invention that the outer base plate 26 and seat back arm 30 could be cylindrical members and the pawls 132, which will be discussed in greater detail below, could be mounted radially outwardly of the cylindrical members so as to pivot inwardly into releasably locked engagement with the cylindrical members.

The locking mechanism 24 comprises a manually operable actuating structure 78, which includes a forward handle 80 with a handle grip 82, and a rearward handle 59, also with a handle grip 84. A free end 86 of a small outwardly extending arm element 88 on the forward portion of the rearward handle member 59 fits through a slightly curved, elongated actuating slot 90 in the outer base plate 26 and controls operation of the actuating structure 78. The rearward handle 59 mounts on the pivot pin 38 between the front spacing washer 60 and the outer base plate 26. The pivot pin 38 extends through a circular aperture 92 near the longitudinal center of the rearward handle 59 and serves to pivotally mount the rearward handle 59 for movement between locking and releasing positions. The forward handle 80 is pivotally mounted on a stub shaft 114 extending outwardly from the outer base plate 26 so as to be moved between locking and releasing positions. The actuating structure 78 is biased into a normal locking position by a spring 94, a spring 96 and a spring 98. A coiled end 100 of the spring 94 is mounted on, and coiled about, a split extension portion 102 of the pivot pin 38. A nubbed, free end 104 of the spring 94 is attached to the seat back arm 30 through an elongated aperture 106 in an outwardly extended arm element 108 of the seat back arm 30 that extends parallel to the axis of the stationary pivot pin 38, to pre-tension the manually operable actuating structure.

The tensile coil spring 98 has one end thereof connected to the rearward handle 59 within a circular aperture 110 formed therein between the central opening 92 and the handle 84. The other end of the rear coil spring 98 is attached to the outer base plate 26 by a bracket 112 fixed thereto in a position below the rear handle 84.

The front coil spring 96 has its central coil or coils mounted over the stub shaft 114 on which the forward handle 80 is pivoted. The stub shaft 114 fits through a circular aperture 116 in the mid-portion of the forward handle 80. One end of the front spring 96 connects to the forward handle 80 at a small circular opening 118 of a bracket 119 fixed to the forward handle 80. The other end of the front spring 96 attaches to the outer base plate 26 within a circular aperture 120 formed therein.

The forward handle 80 and the rearward handle 59 are operatively connected together for cooperative movement so that each will move between locking and releasing positions when either is so moved. As shown, the adjacent free ends of the two handles 80 and 59 are mutually connected to a connection pin 122 that has one end thereof extended through a circular aperture 124 in the rearward handle 59 and fixed thereto by cold forming. A central cylindrical portion of the connecting pin 12 between the fixed end and the enlarged head thereof fits within an elongated slot 128 in a transversely offset end 130 of the forward handle 80.

The manually releasable locking mechanism 24 has preferably three annularly arranged identical, individually mounted, pivoting pawls 132, each mounted on a separate pivot pin 134 defining a pivot axis and fixed to the outer base plate 26. Each pawl 132 consists of a short inwardly extending leg 138, and a long leg 140 extending outward, approximately perpendicular to the short leg 138. The short inwardly extending leg 138 contains a pivot initiating protrusion 142 and a smooth non-engaging surface 144. The long engagement leg 140 has a series of spaced teeth 148 and a smooth concave camming surface 150.

Each pawl 132 engages simultaneously with the teeth 68 on the outer base plate 26 and the teeth 74 on the seat back arm 30 in a releasably intermeshed relationship. One-half of the width of the locking teeth 148 on the three pawls 132 mesh with the teeth 68 and the other one-half of the width of the teeth 148 mesh with the teeth 74 on the seat back arm 30.

A rotatable camming member 136 centrally mounts on the pivot pin 38. The camming member 136 is positioned on the pivot pin 38 between the outer base plate 26 and the outer plate 28. The camming member 136 moves in response to the manual actuation of either of the handle 80 or 59. The extent of the arm element 88 through the arcuate slot 90 in the outer base plate 26 and into the slot 154 both limits the movement of the handle 80 and 59 and provides an interconnection between the handle 59 and the camming member 136 which insures that each will pivot about the pivot pin 38 (and pivot axis) together.

The camming member 136 contains three identical actuation protrusions 156 circumferentially spaced over an outer surface 158. The remainder of the outer surface 158 consists of a series of three spaced, concave cam surfaces 160.

Figure 4:
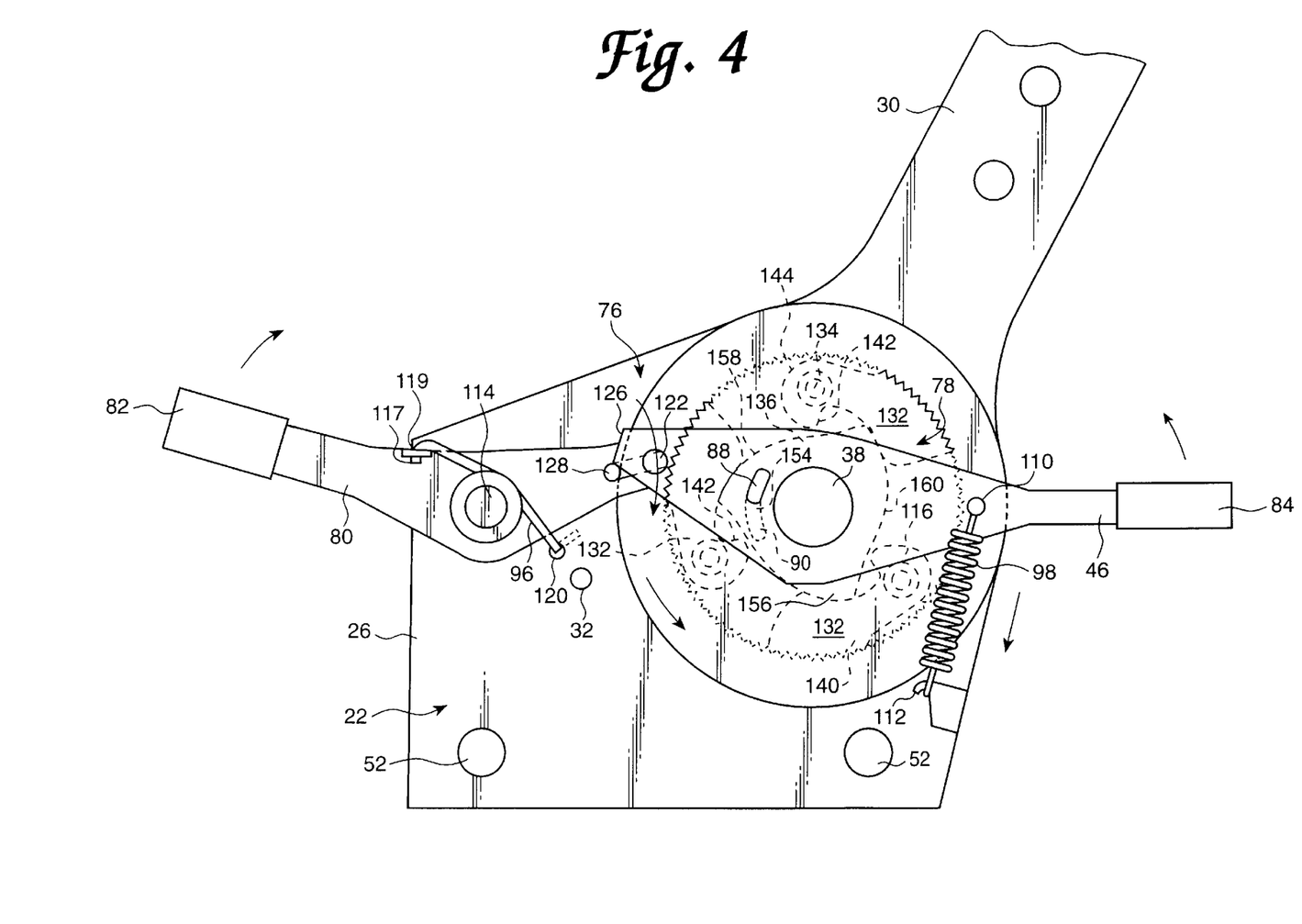
FIG. 4 of the drawings is a side view of the recliner assembly of FIG. 1 with the assembly locked in place, with the proximal cover plate removed to reveal the operating components, with hidden components shown in phantom notation.
Figure 5:
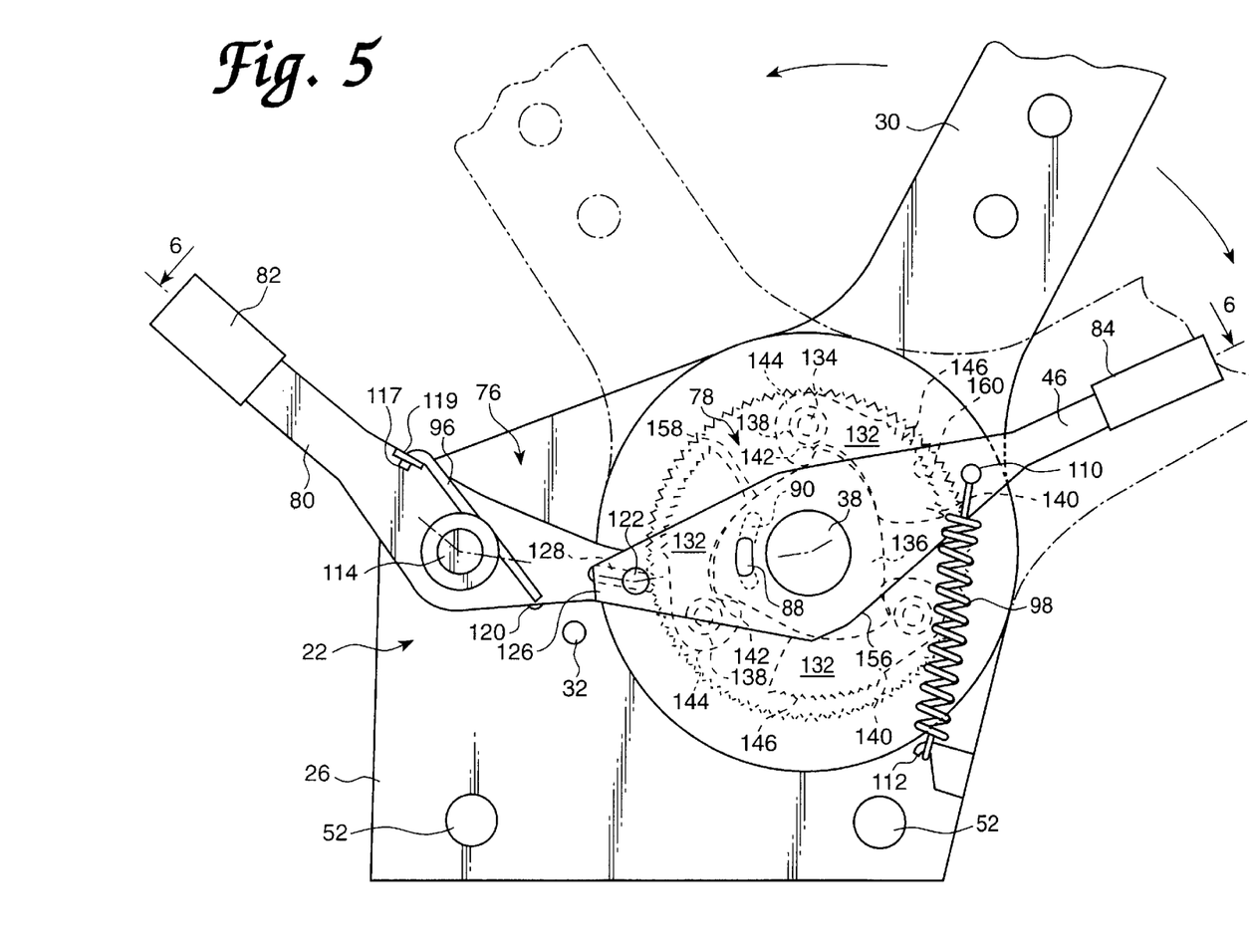
FIG. 5 of the drawings is a side view of the recliner assembly of FIG. 1 with the assembly unlocked and disengaged, free to recline backward or pivot forward, with the proximal cover plate removed to reveal the operating components, with hidden components shown in phantom notation.
Figure 6:
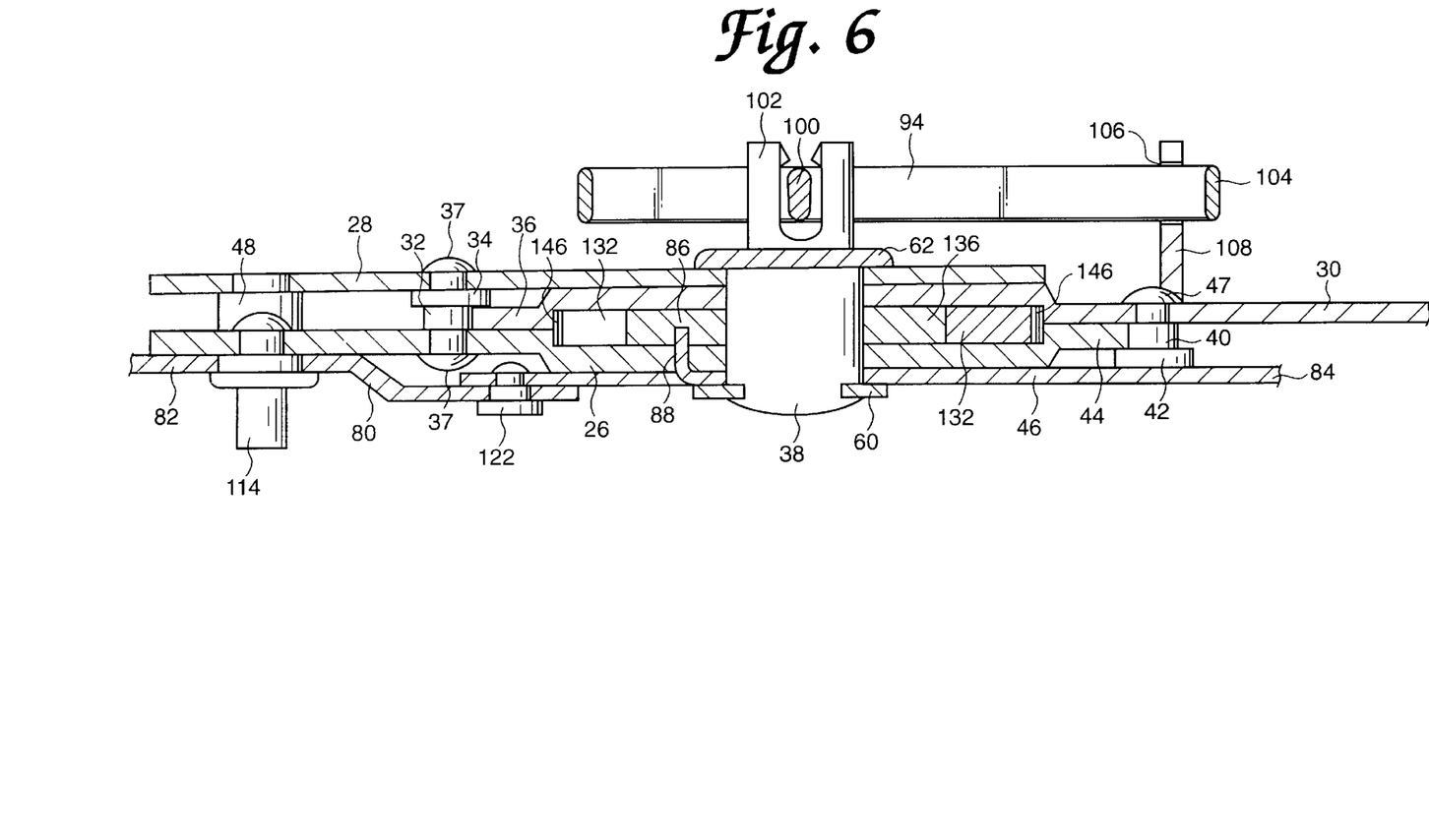
FIG. 6 of the drawings is a cross section through line 6—6 of FIG. 5 as it would appear with the recliner assembly unlocked and free to move.

When the manually releasable locking mechanism 24 is moved into its releasably locked position, as shown in FIG. 4, the recliner assembly 20 is locked in place and the cam-like smooth surfaces 160 of the camming member 136 are in contact with the camming surfaces 150 on the three pawls 132. This contact maintains the intermeshed, releasably engaged condition of the locking teeth 148 with the teeth 68, 74.

Although the preferred embodiment described herein is operated by a mechanical system, it is within the scope of the present invention that the manual operation could be affected by means of an electrically powered system. For example, it would be relatively easy to utilize a solenoid to accomplish such a movement.

During the normal use of the seat, the springs 96 and 98 serve to bias the two handles 80 and 59 into the locked positions so that the seat back 18 is retained in a specific reclining position within the range of reclining positions provided.

The locking mechanism 24 is moved to its released position by the user applying an upward manual force to either the front handle grip 82 or the rear handle grip 84. The application of the manual force to either handle grip 82, 84 causes the rotatable camming member 136 to be engaged by the small outwardly extending arm element 88 on the rearward handle 59, and then to pivot in the counter-clockwise direction, as viewed in FIG. 4, about the pivot pin 38 as the handle 80 or 59 is raised and operated.

As the camming member 136 pivots slightly in a first sense (the counter-clockwise direction, as viewed in FIG. 5), about the pivot pin 38, the leading edges of the three actuation protrusions 156 make contact with the pivot initiating protrusions 142 of the pawls 132. This causes the pawls 132 to pivot in the disengaging sense about the pins 134. The pivoting action causes the teeth 148 of each pawl 132 to disengage from the teeth 68 and the teeth 74.

The manual actuation of either handle 59, 80 causes the initiating protrusions 156 on the camming member 136 to separate from the pivot initiating protrusion 142. The camming surface 160 now moves in the engaging sense and makes contact with the camming surface 150, forcing the teeth 148 into engagement with the teeth 68, 74 in a positive manner. When the teeth 66, 74, 148 fully engage, the seat back arm 30 locks in an angular position determined by the relative position of the seat back 18 with respect to the seat cushion 12.

When a user desires to adjust the reclining position of the seat back 18 within the range of positions provided, the user simply reaches down and grasps the handle 80 and moves the forward handle 80 upwardly from its locking position into its releasing position. This releases the locking mechanism 24 enabling the seat back 18 to be moved into the desired position. Once the desired new reclining position is obtained, the user simply releases the handle 80, allowing the handle to be returned from its releasing position into its locking position by the bias of spring 96, thus moving the releasable locking mechanism 24 from its releasing position into its locking position.

The handle 84 is utilized to effect a forward dumping action of the seat back 18 when access rearwardly of the seat is desired (i.e., such as by an occupant seated behind the seat assembly 10). The user simply grasps the handle 80 or 59 and moves the handle upwardly against the bias of the respective spring, which in turn moves the releasable locking mechanism 24 from its locking position into its releasing position. With the locking mechanism 24 in its releasing position, the spring 94 will bias the seat back 18 forwardly into its dump position. After access has been obtained, the seat back 18 can be manually returned from its dump position into a normal operating position within the range of reclining positions provided by insuring that the releasable locking mechanism 24 is held into its releasing position through the actuation of one of the two handles 80 and 59.

The pawls 132 are moved in and out of engagement in a positive manner which prevents the teeth 68, 74, 148 from wearing down and ensures that the pawls 132 will be capable of effectively transmitting forces from the seat back 18 to the seat cushion 12.

It is also contemplated that a linkage or other connecting device may be used to achieve movement of the pawls 132 in a positive manner rather an abutting the actuation protrusions.

While the invention has been described in connection with what is presently considered to be the most practical and preferred embodiments, it is to be understood that the invention is not limited to the disclosed embodiment but on the contrary, is intended to cover various modifications and equivalent arrangements included within the scope of the appended claims.

What is claimed is:

1. A recliner assembly for hingedly connecting a seat back and a seat cushion, said recliner assembly comprising:

a base plate mounted to the seat cushion, said base plate having a circular cavity with an inner circumference lined with teeth;

an arm mounted to the seat back and pivotally engaging the base plate for sliding relative movement thereto for forward and rearward pivotal movement of the seat back, said arm having a circular cavity with an inner circumference lined with teeth and coaxially mounted in a face to face manner with the circular cavity of the base plate;

a locking mechanism for locking the seat back in one of a range of seat back positions and selectively releasing the seat back for adjustment of the seat back relative to the seat cushion and dumping the seat forwardly providing access rearward of the seat cushion, said locking mechanism comprising:

a plurality of pawls pivotally connected to said base plate and movable between an engaged position where the pawls lockably engage the teeth of both the base plate and the arm and a disengaged position where the pawls are disengaged therefrom, a camming member rotatably mounted between the base plate and the arm, said camming member rotatable in a first sense engaging the plurality of pawls urging the pawls to the disengaged position and rotatable in an opposite sense engaging the plurality of pawls urging the pawls to the engaged position, and an actuator operatively engaging the camming member for effecting the rotatable movement of the camming member to selectively lock and release the recliner assembly.

2. A recliner assembly according to claim 1, wherein said actuator comprises a forward handle and a rearward handle, said forward handle and said rearward handle pivotally mounted to the base plate and pivotally linked together for cooperative engagement with the camming member.

3. A recliner assembly according to claim 2, wherein said forward handle and said rearward handle are biased to urge the locking mechanism to a locked position.

4. A recliner assembly according to claim 3, wherein the arm is biased for forward pivotal movement.

5. A recliner assembly according to claim 3, wherein said pawl has a short leg extending generally radially inwardly with respect to said circular cavities, and a long leg extending generally perpendicular thereto, said rotatable camming member having at least one generally radially outwardly extending actuation protrusion for engaging the short leg as the camming member is rotated in the first sense and for engaging the long leg as the camming member is rotated in the opposite sense.

6. A recliner assembly according to claim 5, wherein the recliner assembly further comprises an outer base plate connected to the base plate sandwiching the arm therebetween.

7. A reclining vehicle seat assembly for use in a motor vehicle, said assembly comprising:

a seat cushion, a seat back, and a recliner assembly pivotally mounting said seat back to said seat cushion for forward and rearward pivotal reclining movement about a transversely extending pivot axis, said recliner assembly including:

a base plate mounted to the seat cushion, said base plate having a circular cavity with an inner circumference lined with teeth;

an arm mounted to the seat back and pivotally engaging the base plate for sliding relative movement thereto for forward and rearward pivotal movement of the seat back, said arm having a circular cavity with an inner circumference lined with teeth and coaxially mounted in a face to face manner with the circular cavity of the base plate;

a locking mechanism for locking the seat back in one of a range of seat back positions and selectively releasing the seat back for adjustment of the seat back relative to the seat cushion and dumping the seat forwardly providing access rearward of the seat cushion, said locking mechanism comprising:

a plurality of pawls pivotally connected to said base plate and movable between an engaged position where the pawls lockably engage the teeth of both the base plate and the arm and a disengaged position where the pawls are disengaged therefrom, a camming member rotatably mounted between the base plate and the arm, said camming member rotatable in a first sense engaging the plurality of pawls urging the pawls to the disengaged position and rotatable in an opposite sense engaging the plurality of pawls urging the pawls to the engaged position, and an actuator operatively engaging the camming member for effecting the rotatable movement of the camming member to selectively lock and release the recliner assembly.

8. A vehicle seat assembly according to claim 7, wherein said actuator comprises a forward handle and a rearward handle, said forward handle and said rearward handle pivotally mounted to the base plate and pivotally linked together for cooperative engagement with the camming member.

9. A vehicle seat assembly according to claim 8, wherein said forward handle and said rearward handle are biased to urge the locking mechanism to a locked position.

10. A vehicle seat assembly according to claim 9, wherein the arm is biased for forward pivotal movement.

11. A vehicle seat assembly according to claim 9, wherein said pawl has a short leg extending generally radially inwardly with respect to said circular cavities, and a long leg extending generally perpendicular thereto, said rotatable camming member having at least one generally radially outwardly extending actuation protrusion for engaging the short leg as the camming member is rotated in the first sense and for engaging the long leg as the camming member is rotated in the opposite sense.

12. A vehicle seat assembly according to claim 11, wherein the recliner assembly further comprises an outer base plate connected to the base plate sandwiching the arm therebetween.

* * * * *